United States Patent
Holzman et al.

(10) Patent No.: US 12,541,351 B2
(45) Date of Patent: *Feb. 3, 2026

(54) DEPLOYMENT OF CLOUD INFRASTRUCTURES USING A CLOUD MANAGEMENT PLATFORM

(71) Applicant: VMware LLC, Palo Alto, CA (US)

(72) Inventors: Danny Holzman, San Francisco, CA (US); Rambabu Duddukuri, Union City, CA (US); Kiran Krishna Singh, Vancouver (CA); Kathleen Mcdonough, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,825

(22) Filed: Jul. 28, 2023

(65) Prior Publication Data
US 2025/0013448 A1 Jan. 9, 2025

Related U.S. Application Data

(63) Continuation of application No. 17/386,418, filed on Jul. 27, 2021, now Pat. No. 11,755,301.

(51) Int. Cl.
  *G06F 9/445* (2018.01)
  *G06F 3/06* (2006.01)
  (Continued)

(52) U.S. Cl.
  CPC . *G06F 8/60* (2013.01); *G06F 8/71* (2013.01)

(58) Field of Classification Search
  CPC ..... G06F 8/60; G06F 8/71; G06F 9/50; G06F 9/445; G06F 9/448; G06F 8/61;
  (Continued)

(56) References Cited

U.S. PATENT DOCUMENTS 10,241,770 B2 * 3/2019 Risbood ................ G06F 9/4492
10,243,819 B1   3/2019 Chheda et al.
(Continued)

FOREIGN PATENT DOCUMENTS

EP  3128418 A1  2/2017
EP  3611619 A1  2/2020
(Continued)

OTHER PUBLICATIONS

Non-Final Office Action received for U.S. Appl. No. 17/386,418, mailed on Nov. 28, 2022, 14 pages.
(Continued)

*Primary Examiner* — Thuy Dao
(74) *Attorney, Agent, or Firm* — Kim & Stewart LLP

(57) ABSTRACT

This disclosure relates generally to creating and managing cloud infrastructure, and more specifically, integrating one or more cloud infrastructure tools for building cloud infrastructures. An example method includes, receiving a request to deploy a cloud infrastructure on a cloud service provider based on a cloud template of the cloud management platform; transmitting configuration instructions to a container orchestration platform for execution on one or more containers running on the container orchestration platform, the configuration instructions directing the one or more containers to deploy the cloud infrastructure; receiving a deployment state of the cloud infrastructure on the cloud service provider from the container orchestration platform following execution of the configuration instructions; and reporting a status of the cloud infrastructure based on the deployment state.

18 Claims, 10 Drawing Sheets

(51) Int. Cl.
*G06F 8/60* (2018.01)
*G06F 8/71* (2018.01)
*G06F 9/00* (2018.01)
*G06F 9/50* (2006.01)

(58) Field of Classification Search
CPC ........ G06F 8/63; G06F 9/45558; G06F 9/547; G06F 8/65; H04L 67/306; H04L 67/10; H04L 67/34
See application file for complete search history.

(56) References Cited

U.S. PATENT DOCUMENTS

| | | | |
|---|---|---|---|
| 10,318,285 | B1 | 6/2019 | Jodoin et al. |
| 10,331,419 | B2 | 6/2019 | Essenmacher et al. |
| 11,099,976 | B2 | 8/2021 | Khakare et al. |
| 11,113,186 | B1 | 9/2021 | Hussain et al. |
| 11,134,013 | B1 | 9/2021 | Allen et al. |
| 11,201,835 | B1 | 12/2021 | Roberts et al. |
| 11,431,563 | B1 | 8/2022 | Holzman et al. |
| 11,914,753 | B2 * | 2/2024 | Netsch ................ G06F 21/6281 |
| 2012/0266168 | A1 * | 10/2012 | Spivak ...................... G06F 8/65 718/1 |
| 2014/0019967 | A1 | 1/2014 | Gupta |
| 2015/0347115 | A1 | 12/2015 | Hong et al. |
| 2016/0164753 | A1 | 6/2016 | Cimprich et al. |
| 2017/0201597 | A1 | 7/2017 | Narasimhan et al. |
| 2017/0207968 | A1 | 7/2017 | Eicken et al. |
| 2017/0270091 | A1 * | 9/2017 | Singh .................. G06F 9/45512 |
| 2017/0300309 | A1 | 10/2017 | Berger et al. |
| 2017/0317881 | A1 | 11/2017 | Smartt et al. |
| 2018/0077024 | A1 | 3/2018 | Zhang |
| 2018/0115551 | A1 | 4/2018 | Cole |
| 2019/0004865 | A1 * | 1/2019 | Ivanov .................... G06F 9/455 |
| 2019/0028364 | A1 | 1/2019 | Keller et al. |
| 2020/0059420 | A1 | 2/2020 | Abraham |
| 2020/0089518 | A1 | 3/2020 | Beyer et al. |
| 2020/0133737 | A1 | 4/2020 | Gunaratne et al. |
| 2020/0329464 | A1 | 10/2020 | Madapoosi Sampath et al. |
| 2021/0019194 | A1 | 1/2021 | Bahl et al. |
| 2021/0019195 | A1 | 1/2021 | Aronov et al. |
| 2021/0111949 | A1 | 4/2021 | Collins |
| 2021/0208934 | A1 | 7/2021 | Jadhav et al. |
| 2021/0289435 | A1 | 9/2021 | Li |
| 2022/0021652 | A1 | 1/2022 | Moghe et al. |
| 2023/0035600 | A1 | 2/2023 | Holzman et al. |
| 2023/0037199 | A1 | 2/2023 | Holzman et al. |

FOREIGN PATENT DOCUMENTS

| | | |
|---|---|---|
| WO | 2020/033401 A1 | 2/2020 |
| WO | 2020/226563 A1 | 11/2020 |
| WO | 2021/069683 A1 | 4/2021 |

OTHER PUBLICATIONS

Notice of Allowance received for U.S. Appl. No. 17/386,418, mailed on May 12, 2023, 8 pages.
Final Office Action received for U.S. Appl. No. 17/386,412, mailed on Mar. 8, 2023, 29 pages.
Non-Final Office Action received for U.S. Appl. No. 17/386,412, mailed on Aug. 4, 2023, 32 pages.
Non-Final Office Action received for U.S. Appl. No. 17/386,412, mailed on Oct. 27, 2022, 27 pages.
Notice of Allowance received for U.S. Appl. No. 17/386,416, mailed on Jun. 9, 2022, 12 pages.

* cited by examiner

```
 1 ▼ inputs:
 2 ▼   instance_type:
 3       type: string
 4       default: t2.micro
 5       description: AWS instance type
 6 ▼   department:
 7       type: string
 8       description: Department tag
 9 ▼ resources:
@10 ▼   terraform_2:
11       type: Cloud.Terraform.Configuration
12 ▼     properties:
13 ▼       providers:
14           - name: aws
15             cloudZone: aws-e2e/us-east-1
16 ▼       variables:
17           instance_type: '${input.instance_type}'
18           department: '${input.department}'
19         terraformVersion: 0.12.29
20 ▼       contentSource:
21           contentSourceId: d56f6baa-820b-417f-a38c-103bc1684c2d
22           path: /template2
23           version: 28af1e4f2a8b91621cea9873eb69643d83adc813
24 ▼   terraform_1:
25       type: Cloud.Terraform.Configuration
26 ▼     properties:
27 ▼       providers:
28           - name: aws
29             cloudZone: aws-e2e/us-east-1
30 ▼       variables:
31           instance_type: '${input.instance_type}'
32           department: '${input.department}'
33         terraformVersion: 0.12.29
34 ▼       contentSource:
35           contentSourceId: d56f6baa-820b-417f-a38c-103bc1684c2d
36           path: /template2
```

FIG. 3B

[History]

475 → CREATE ksingh@vmwar... | Successful | Requested by ksingh@vmware.com | Provisioning diagram
482 → Create Events | Request details

| Timestamp | Status | Resource type | Resource name |
|---|---|---|---|
| Jul 23, 2021, 9:39:51 AM | REQUEST_FINISHED | | |
| Jul 23, 2021, 9:39:51 AM | COMPLETION_FINISHED | | |
| Jul 23, 2021, 9:39:20 AM | COMPLETION_IN_PROGRESS | | |
| Jul 23, 2021, 9:39:06 AM | CREATE_FINISHED | Cloud.Machine | Cloud_Machine_1 |
| Jul 23, 2021, 9:37:50 AM | CREATE_IN_PROGRESS | Cloud.Machine | Cloud_Machine_1 |
| Jul 23, 2021, 9:37:09 AM | CREATE_FINISHED | Cloud.Terraform.Configuration | terraform_1 |
| Jul 23, 2021, 9:36:18 AM | CREATE_FINISHED | Cloud.Terraform.Configuration | terraform_2 |
| Jul 23, 2021, 9:33:19 AM | CREATE_IN_PROGRESS | Cloud.Terraform.Configuration | terraform_1 |
| Jul 23, 2021, 9:33:19 AM | CREATE_IN_PROGRESS | Cloud.Terraform.Configuration | terraform_2 |
| Jul 23, 2021, 9:32:51 AM | APPROVAL_FINISHED | | |
| Jul 23, 2021, 9:32:09 AM | APPROVAL_IN_PROGRESS | | |
| Jul 23, 2021, 9:32:09 AM | PLAN_FINISHED | Cloud.Terraform.Configuration | terraform_1 |
| Jul 23, 2021, 9:29:52 AM | PLAN_IN_PROGRESS | Cloud.Terraform.Configuration | terraform_1 |
| Jul 23, 2021, 9:29:52 AM | PLAN_FINISHED | Cloud.Terraform.Configuration | terraform_2 |
| Jul 23, 2021, 9:27:38 AM | PLAN_IN_PROGRESS | Cloud.Terraform.Configuration | terraform_2 |
| Jul 23, 2021, 9:27:38 AM | ALLOCATE_FINISHED | Cloud.Machine | Cloud_Machine_1 |
| Jul 23, 2021, 9:26:43 AM | ALLOCATE_IN_PROGRESS | Cloud.Machine | Cloud_Machine_1 |

FIG. 4E

DEPLOYMENT OF CLOUD INFRASTRUCTURES USING A CLOUD MANAGEMENT PLATFORM

CROSS-REFERENCE TO RELATED APPLICATIONS

This application is a continuation of U.S. patent application Ser. No. 17/386,418, entitled "Deployment of Cloud Infrastructures Using A Cloud Management Platform," filed Jul. 27, 2021, the content of which is incorporated herein by reference in its entirety for all purposes.

FIELD

The present disclosure relates generally to creating and managing cloud infrastructures, and more specifically, integrating one or more cloud infrastructure tools for creating and managing cloud infrastructures.

BACKGROUND

Cloud services are generally made available to customers on demand (e.g., via a subscription) using infrastructures provided by cloud service providers (e.g., Azure, AWS, Google Cloud, etc.). Different types of cloud services including Software-as-a-Service (Saas), Platform-as-a-Service (PaaS), Infrastructure-as-a-Service (IaaS), and the like are available to customers.

Cloud service providers may provide a wide range of services that enable the customers to deploy and manage various workloads (e.g., virtual machines, containers, applications). Unfortunately, customers of these cloud service providers often spend considerable amounts of time trying to create and manage cloud infrastructures across different platforms to support their business needs. While certain cloud infrastructure tools (e.g., Terraform®) provide a mechanism to automate creation and management of cloud infrastructures across multiple cloud service providers, a customer's primary cloud management platform may not support such cloud infrastructure tools. Accordingly, cloud management platforms supporting tools that manage cloud and on-premise infrastructures are desirable.

SUMMARY

This disclosure describes mechanisms for providing portability of a cloud infrastructure across multiple cloud platforms.

A non-transitory computer-readable storage medium storing instructions configured to be executed by one or more processors of a server associated with a cloud management platform to carry out steps that include: receiving a request to deploy a cloud infrastructure on a cloud service provider based on a cloud template of the cloud management platform; transmitting configuration instructions associated with a cloud infrastructure tool to a container orchestration platform for execution on one or more containers running on the container orchestration platform to deploy the cloud infrastructure; receiving a deployment state of the cloud infrastructure on the cloud service provider from the container orchestration platform following execution of the configuration instructions; and reporting a status of the cloud infrastructure based on the deployment state.

A computer implemented method, comprising: at a cloud management platform: receiving a request to deploy a cloud infrastructure on a cloud service provider based on a cloud template of the cloud management platform; transmitting configuration instructions associated with an infrastructure tool to a container orchestration platform for execution on one or more containers running on the container orchestration platform to deploy the cloud infrastructure; receiving a deployment state of the cloud infrastructure on the cloud service provider from the container orchestration platform following execution of the configuration instructions; and reporting a status of the cloud infrastructure based on the deployment state.

A server associated with a cloud management platform, the server comprising: one or more processors; and memory storing one or more programs configured to be executed by the one or more processors, the one or more programs including instructions for: receiving a request to deploy a cloud infrastructure on a cloud service provider based on a cloud template of the cloud management platform; transmitting configuration instructions associated with a cloud infrastructure tool to a container orchestration platform for execution on one or more containers running on the container orchestration platform to deploy the cloud infrastructure; receiving a deployment state of the cloud infrastructure on the cloud service provider from the container orchestration platform following execution of the configuration instructions; and reporting a status of the cloud infrastructure based on the deployment state.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIG. 3B shows a graphical user interface of a cloud management platform, depicting resources of an exemplary hybrid cloud template that includes a native resource and non-native resources.

FIG. 4E shows a user interface displaying the state of one or more commands processed for creating and managing the cloud infrastructure, in accordance with the embodiments described herein.

DETAILED DESCRIPTION

Figure 1:
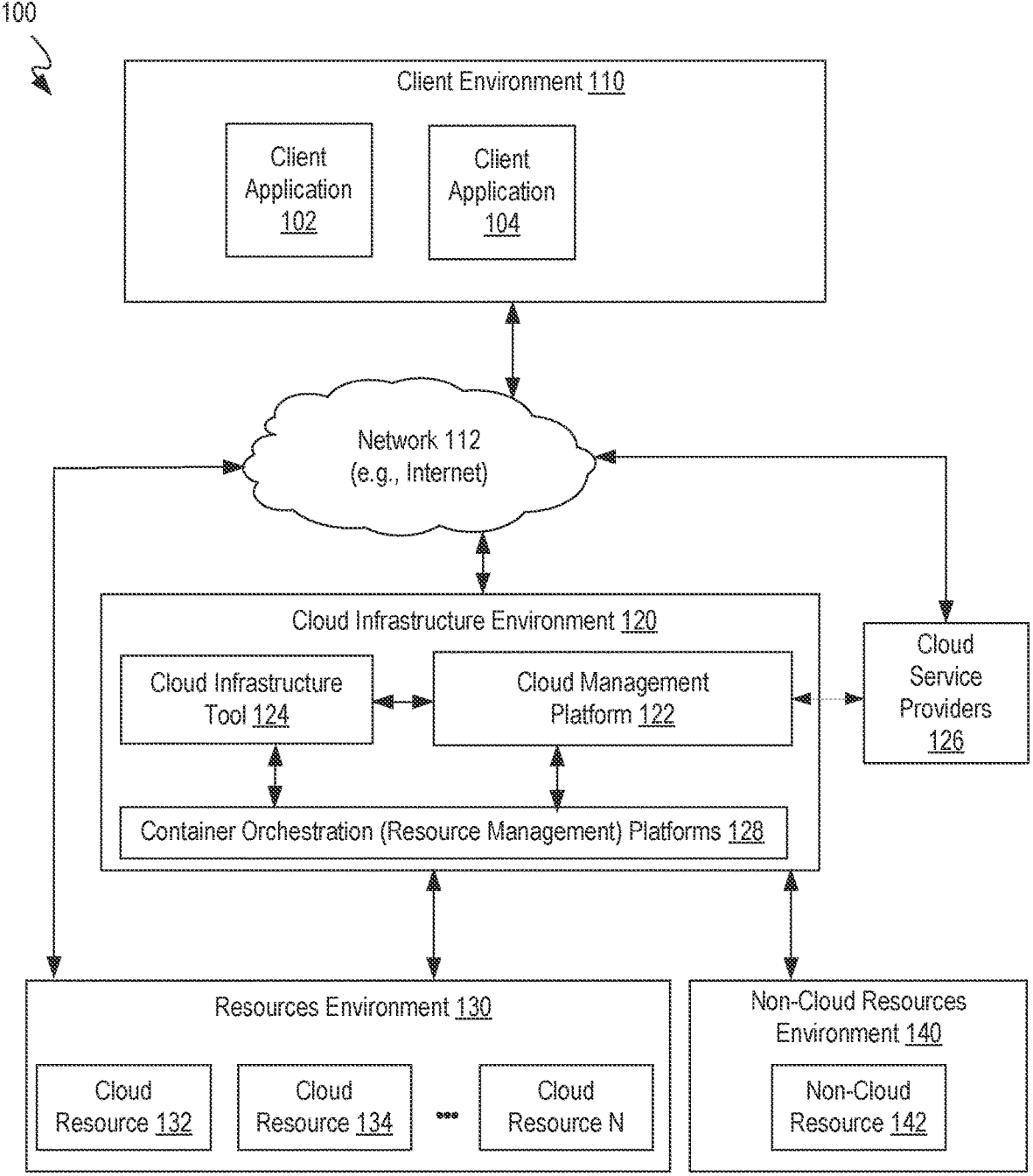
FIG. 1 shows a block diagram illustrating an exemplary cloud computing system suitable for use in accordance with the embodiments described herein.

Certain details are set forth below to provide a sufficient understanding of various embodiments of the invention. However, it will be clear to one skilled in the art that embodiments of the invention may be practiced without one or more of these particular details. Moreover, the particular embodiments of the present invention described herein are provided by way of example and should not be used to limit the scope of the invention to these particular embodiments. In other instances, hardware components, network architectures, and/or software operations have not been shown in detail in order to avoid unnecessarily obscuring the invention.

The demand for cloud-based services continues to increase rapidly. Typically, customers may use multiple cloud services in combination to support their enterprise or business. By subscribing to cloud services, the customers can utilize a set of resources without having to purchase separate hardware and software resources to support their business needs. A cloud infrastructure provided by a cloud service provider generally includes high-performance compute, memory and network resources or components.

Typically, servers and systems that make up the cloud service providers' cloud infrastructure are separate from customer's own on-premise servers and systems. Customers of cloud services may use multiple services provided by different cloud service providers for their enterprise. Accordingly, the customers may be required to manage their cloud-based workloads separately in similar manner as they manage their on-premise workloads. Deploying and managing cloud infrastructures to utilize resources from multiple cloud service providers is time consuming and inconvenient to the customers.

Certain cloud infrastructure tools (e.g., Terraform®, Ansible®, and Pulumi®) provide a mechanism to automate managing of cloud infrastructures for multiple cloud service providers. However, a customer's on-premise platform or a primary cloud management platform used by the customer may not support such cloud infrastructure tools. Thus, the customer's primary cloud management platform may require additional mechanisms to understand and accommodate processing involving the cloud infrastructure tools for creating and managing cloud infrastructures. Specifically, the cloud management platform may be required to understand configuration files that define desired states of cloud infrastructures, creating and validating plans for achieving the desired states of cloud infrastructures using a cloud infrastructure tool, executing plans to create the cloud infrastructures, and storing states of the cloud infrastructures in order to allow updates to the created cloud infrastructures for the one or more cloud service providers.

In addition, the cloud management platform may be required to understand non-native cloud resources within the cloud infrastructure created to achieve the desired state of cloud infrastructure. Understanding the non-native cloud resources within the cloud infrastructure may enable the cloud management platform to convert, store, and manage the non-native cloud resources using a native format of the cloud management platform. Accordingly, the cloud management platform may be required to orchestrate an external system (such as a cloud integration tool) to create cloud infrastructure and then later manage non-native cloud resources deployed under the cloud infrastructure as the cloud management platform would manage its own deployments.

These and other embodiments are discussed below with reference to FIGS. 1-6. Those skilled in the art, however, will readily appreciate that the detailed description given herein with respect to these figures is for explanatory purposes only and should not be construed as limiting.

FIG. 1 shows a block diagram illustrating an exemplary cloud computing system 100 suitable for use in accordance with the embodiments described herein. Specifically, the cloud computing system 100 may include client applications 102 and 104 that use cloud-based web-services. The cloud computing system 100 may further include a cloud infrastructure environment 120 for managing the cloud services that support client applications 102 and 104.

In some examples, the cloud infrastructure environment 120 may include cloud management platform 122, a cloud infrastructure tool 124, and a container orchestration platform 128. The cloud computing system 100 may further include cloud service providers 126, which may interact with the cloud infrastructure tool 124. The cloud computing system 100 can further include resource environment 130 that includes one or more cloud resources such as cloud resource 132, cloud resource 134, and cloud resource N, as shown in FIG. 1.

In some examples, a client application 102 (or 104) within the client environment 110 may be a web application (e.g., an email application, a file storage application, etc.). The client application 102 (or 104) may utilize cloud resources (e.g., 132) for data processing or storage (or other tasks) while executing the client application 102. The client application (102 or 104) may further interact with components within cloud infrastructure environment 120 over network 112.

In some examples, as shown in FIG. 1, one or more components (e.g., cloud management platform 122) within the cloud infrastructure environment 120 may deploy and manage the cloud resources (e.g., 132). The cloud management platform 122 may use the cloud infrastructure tool 124 (e.g., Terraform) to further create and/or manage different cloud infrastructures for cloud service providers 126 (e.g., AWS, Azure, etc.). The cloud infrastructure tool 124 may interact with cloud service providers 126 to understand the cloud infrastructure to be created using the cloud resources (e.g., 132). In some examples, one or more cloud resources (e.g., 132) within the resource environment 130 are provided by the cloud service providers 126. The embodiments, as discussed in FIGS. 2-6 descriptions, discuss techniques for integrating the cloud infrastructure tool 124 to the cloud management platform 122 to create, deploy and/or update different cloud infrastructures for cloud service providers 126.

In the above examples, the cloud management platform 122 may use the cloud infrastructure tool 124 for creating, starting, stopping, and/or managing various resources such as a cloud resource 132 (or 134). Specifically, the cloud management platform 122 may use the container orchestration platform 128 (e.g., Kubernetes®, Red Hat OpenShift®, and the like) to integrate cloud infrastructure tool 124 for managing the resources. The container orchestration platform 128 can be configured to manage one or more container clusters that automatically maintain deployment, scaling, and management of allocated cloud resources (e.g., 132). The cloud management platform 122 may use processes (e.g., jobs) over the container orchestration platform 128 to manage cloud resources via the cloud infrastructure tool 124.

In the above examples, the cloud resources (e.g., 132 and 134) may be processor, memory, network and/or storage related resources. In some examples, the cloud resource 132 may include a host hardware, one or more virtual machines (VMs) running on the host hardware, and a processor for managing the virtual machines within the resource 132. Each of the VMs can be configured to run an operating system that allows for multiple applications or services to run within the VM. The Host hardware may include one or more processors, memory, storage resources, I/O ports and the like to support operation of VMs running on the host hardware. The host hardware may further support a virtualization software that facilitates the creation of VMs.

In above examples, the container orchestration platform 128 may further control the VMs associated with the cloud resource (e.g., 132 or 134). The platform 128 may control or manage VMs within one or more containers to manage client applications (e.g., 102) running on the VMs. Specifically, the platform 128 may be able to auto-scale across different hosts or clusters to support applications running on the VMs.

In above examples, the container orchestration platform 128 may further control the VMs associated with the cloud resource (e.g., 132 or 134). The platform 128 may control or manage VMs within one or more containers to manage client applications (e.g., 102) running on the VMs. Specifically, the platform 128 may be able to auto-scale across different hosts or clusters to support applications running on the VMs.

In some examples, the container orchestration platform 128 may be a job service that creates one or more pods or containers (e.g., Kubernetes® POD) to manage cloud resources via the cloud infrastructure tool 124 (e.g., Terraform® Command Line Interface).

In some examples, a cloud resource may be a native cloud resource or non-native cloud resource. The native resource is backed by a cloud management platform 122 provider while the non-native cloud resource is backed by the cloud infrastructure tool 124. In some examples, the platform 128 may also manage a non-cloud resource 142 (within non-cloud resource environment 140. The non-cloud resource may be a configuration for an web application or a customized resources needed for a client application.

Figure 2:
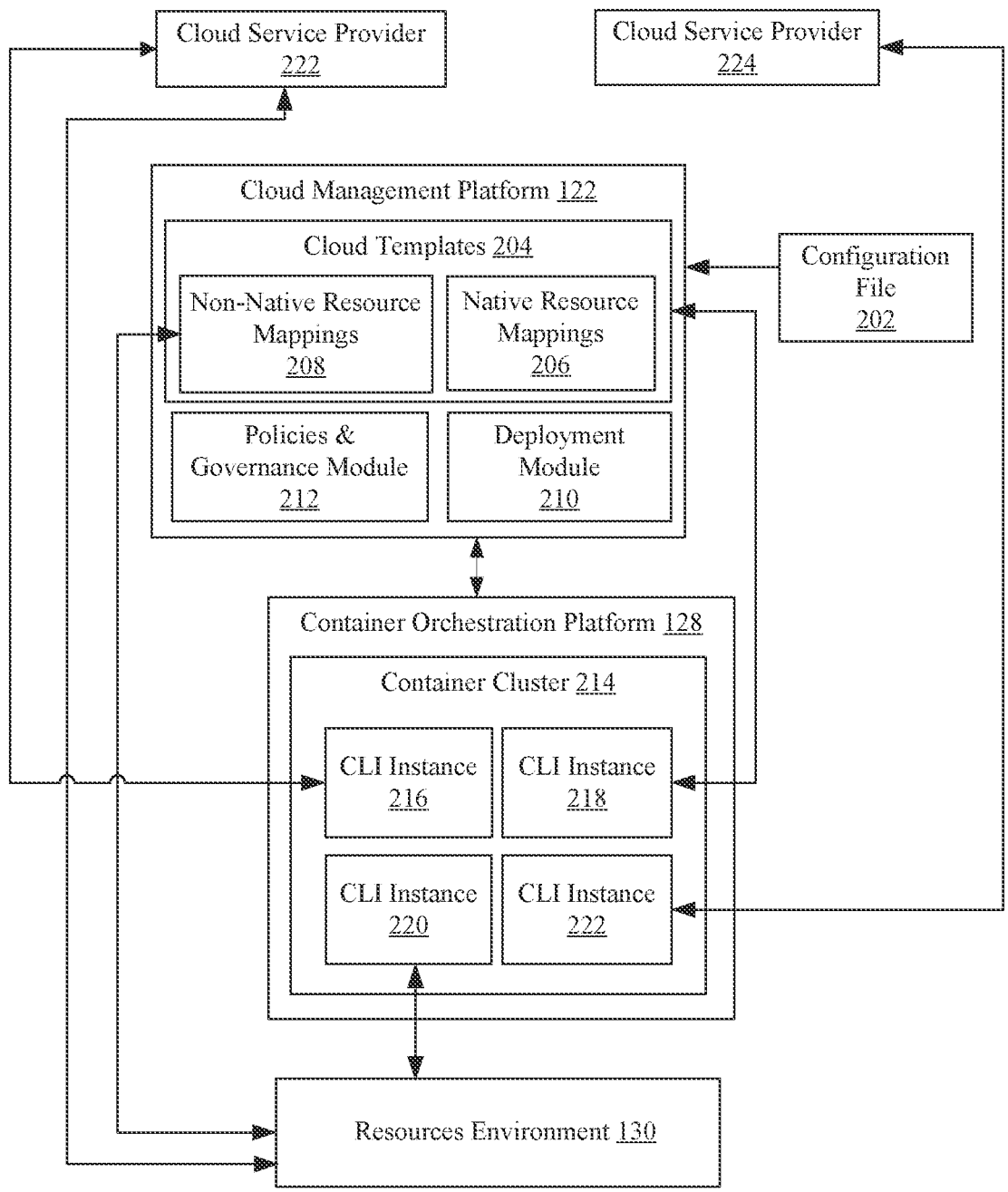
FIG. 2 shows a block diagram illustrating how a cloud management platform interacts with a container orchestration platform and cloud service providers to create and maintain a cloud infrastructure using a cloud infrastructure tool, in accordance with the embodiments described herein.

FIG. 2 shows how cloud management platform 122 interacts with container orchestration platform 128 and cloud service providers to create and maintain a cloud infrastructure using cloud infrastructure tool 124. In some examples, management functions performed by cloud management platform 122 can be initiated when a configuration file 202 is received at cloud management platform 122. Configuration file 202 can take the form of an HCL file. Alternatively, configuration file 202 can take the form of a YAML file, an XML file, or other markup language file detailing a desired configuration of the cloud infrastructure. Cloud management platform 122 is configured to receive configuration files in native and non-native formats. When configuration file 202 is a non-native format configuration file, cloud management platform 122 can be configured to create or update a cloud template 204 associated with the cloud infrastructure and maintain at least a portion of the cloud template in the non-native format. For example, in the case the configuration file takes the form of an HCL file, connection commands, resource mappings and the like can be identified, maintained and stored with one of cloud templates 204 for future use without converting the configurations to a native format. In some examples, cloud management platform 122 can include native resource mappings 206 and non-native resource mappings 208, which can take the form of separate interfaces and/or modules for maintaining resource mappings. This allows cloud management platform 122 to support cloud templates formed using both native and non-native configuration files.

Cloud management platform 122 can also include a graphical editor that allows a user to make updates and changes to any of cloud templates 204. Changes to cloud templates 204 can be saved in native or non-native formats depending on factors, such as resource and provider types. For example, it can be beneficial to save resource mappings in a non-native format, when the connection to the resource is most efficiently performed by leveraging cloud infrastructure tool 124.

FIG. 2 also shows how cloud management platform 122 includes deployment module 210 that help to manage and track the state of cloud infrastructure running on a cloud service provider that have been implemented using one of cloud templates 204. Cloud management platform 122 can be configured to periodically check on deployments associated with deployment module 210 using native or non-native instructions to keep users of cloud management platform 122 informed as to the state of various deployments. Cloud management tool 122 can also include a policies and governance module 212 that helps a customer implement policies for cloud templates 204. In some examples, policies and governance module 212 can be configured to automatically implement policies that are specified by configuration file 202. Policies and governance module 212 can also be configured to apply updates to deployments stored within deployment module 210. In some examples, these updates occurring within deployment module 210 can be referred to as day 2 operations and can be implemented using cloud infrastructure tool 124.

FIG. 2 further shows a connection between cloud management platform 122 and container orchestration platform 128. Container orchestration platform 128 can be configured to run one or more container clusters 214. Exemplary command line interface (CLI) instances 216-222 can be run in separate containers within container cluster 212 and allow for the execution of configuration instructions associated with a cloud infrastructure tool capable of interfacing directly with cloud service providers 222 and/or 224. Information received at CLI instances 216-222 from cloud service providers 222 and 224 can be used to preview the cloud infrastructure resulting from execution of the instructions contained within one of cloud templates 204 prior to its implementation, CLI instances 216-222 can be used to retrieve a state of deployments managed by deployment module 210 and can also interact with and retrieve information from resource environment 130 during its execution. While only four CLI instances are depicted in FIG. 2, it should be appreciated that a much larger or smaller number of CLI instances could be active at any given time to support the operation of cloud management platform 122.

Figure 3A:
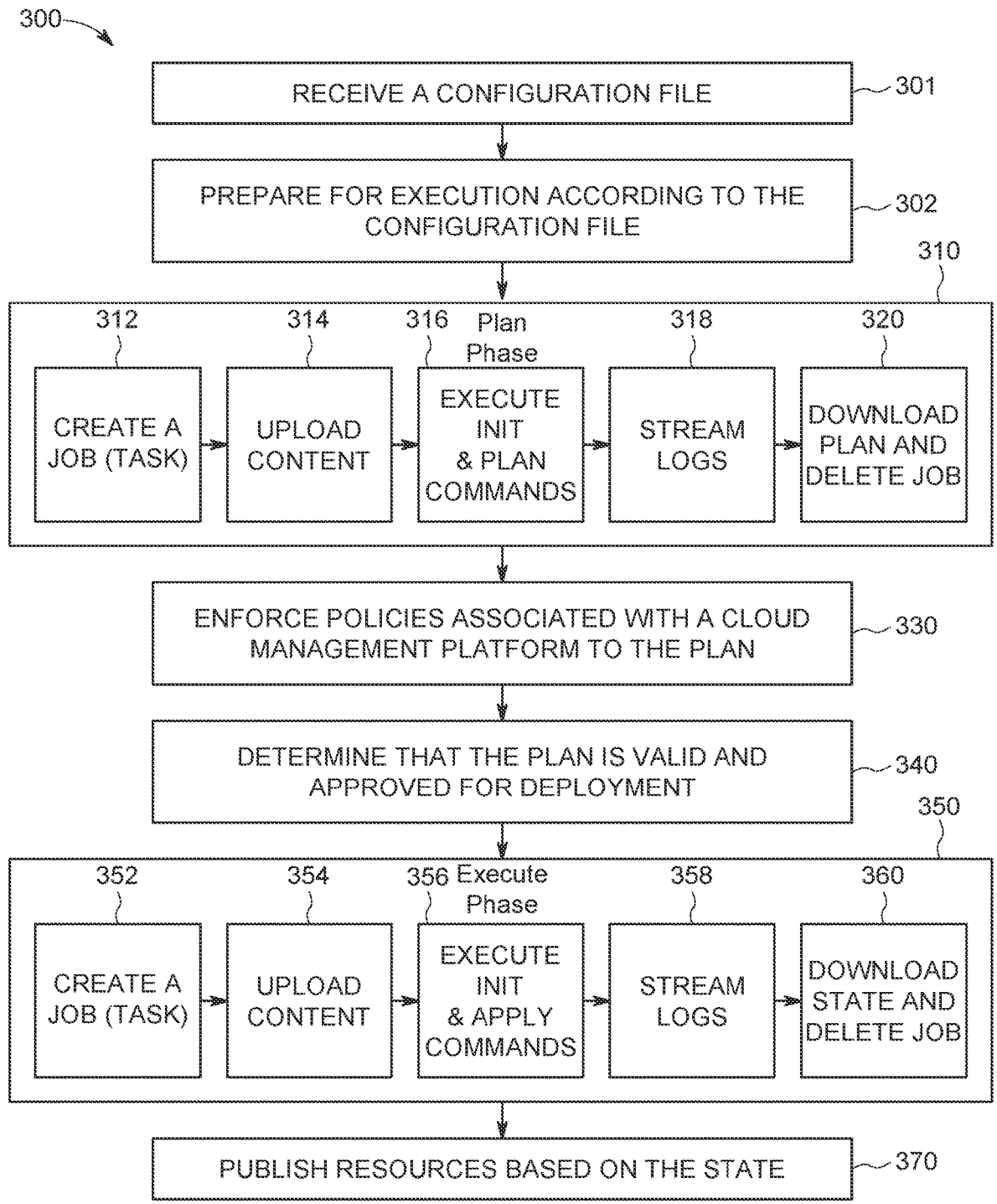
FIG. 3A shows a block diagram illustrating a process for creating and managing a cloud infrastructure using a cloud infrastructure tool, in accordance with the embodiments described herein.

FIG. 3A shows a block diagram illustrating a process 300 for creating and managing a cloud infrastructure using a cloud infrastructure tool, in accordance with the embodiments described herein. As described in FIG. 1 description, the cloud infrastructure tool (e.g., 124) may enable cloud service customers to create, change, and improve a cloud infrastructure to support their enterprise needs. However, such cloud infrastructure tools may not be supported by cloud management platforms (e.g., 122), which the customers may use to create and manage their on-premise workloads or other public or private cloud infrastructures. Integration of cloud infrastructure tools into cloud management platforms may enable customers to create and manage multiple cloud infrastructures or workloads using one interface. Thus, FIG. 3A describes an exemplary process for creating and managing a cloud infrastructure over a cloud management platform using a cloud infrastructure tool.

In some examples, the process 300 shown in FIG. 3A, may be performed by one or more processors or servers implementing the cloud management platform. In some examples, process 300 is performed using the cloud management platform, where the cloud management platform is a client-server system. The blocks of processes 300 are divided up in any manner between the server and a client device. Thus, portions of processes carried out are described herein as being performed by particular devices of a client-server system.

In some examples, in step 301, the cloud management platform receives a configuration file describing the cloud infrastructure required for one or more client applications. The cloud management platform may parse the configuration file to determine a desired state of a cloud infrastructure for one or more client applications. In some examples, the configuration file may be scripted using HCL syntax or a markup language, such as YAML, XML JSON, and the like. In some examples, the cloud management platform may recognize the configuration file based on its extension. For example, upon receiving a configuration file with extension ".tf" the cloud management platform may determine that the file includes a desired state of a cloud infrastructure to be created using Terraform® commands.

In some examples, in step 302, the cloud management platform (or a processor within the cloud management platform) may prepare to create the desired state of the cloud infrastructure. Specifically, the cloud management platform may identify one or more resources, resource providers, and one or more plugins required to create the cloud infrastructure. In some examples, a resource may be a virtual machine, disk, load balancer, or other type of processing, storage or network related resource. In some examples, a resource provider may be a cloud service provider such as Azure, AWS, Google cloud, etc. In some examples, the one or more plugins may help to interpret the requested cloud infrastructure within the configuration file. In some examples, in addition to the plugins, the cloud management platform may identify any additional inputs such as libraries or APIs needed for creating the desired state of the cloud infrastructure.

In the above examples, after identifying resource providers required for creating the desired state of the cloud infrastructure, the cloud management platform may access the resource providers. In some examples, the cloud management platform may verify cloud accounts associated with the identified resources and resource providers. The cloud management platform may also verify whether references to resources within the configuration file are valid. Additionally, the cloud management platform may also download libraries, plugins, and/or APIs required for understanding schema associated with a desired state of the cloud infrastructure. In some examples, the cloud management platform may download a library required to understand the configuration file. In some examples, the cloud management platform (or processor associated within the cloud management platform) may at least assist in identifying and mapping cloud resources within a cloud zones or region associated with cloud accounts referenced within the configuration file by identifying the cloud resources that are closest geographically to the cloud accounts.

In some examples, one or more libraries or plugins required for parsing the configuration file and identifying all the resources, resource providers, and/or inputs may be downloaded or pre-configured within the cloud management platform. Specifically, one or more libraries may be used to parse the configuration file and convert the configuration file to a cloud template (or a blueprint) showing one or more resources, resource providers, and plugins required for creating a cloud infrastructure.

In some examples, the cloud management platform may further execute initialization and plan commands under step 310 that allow a configuration specified in a cloud template to be previewed prior to implementing changes to achieve the desired state of the cloud infrastructure. Specifically, the cloud management platform may use the container orchestration platform 128 in communication with the cloud management platform to perform initialization and execution of the plan. In step 312, the cloud management platform may create a job or task using a container cluster within orchestration platform 128 to execute the plan command. In step 314, the cloud management platform may upload content or a template associated with the configuration file to the job.

In step 316, the cloud management platform may instruct a job or task within a container cluster associated with the container orchestration platform 128 to execute an initialization command. The initialization command may initialize the resources, plugins, and other data associated with one or more resources identified in step 302. In some examples, the initialization command may initialize a working directory associated with the cloud template that contains at least a portion of the configuration file.

The execution of the initialization command may result in the performance of several tasks including downloading and installing cloud service provider plugins. In step 316, the job within the container cluster may perform the initialization command using a command line interface (CLI) associated with the cloud infrastructure tool.

In some examples, in step 316, the cloud management platform may instruct the container cluster's job or task to further execute a plan command. The plan command may be executed to test out or preview the requested configurations (within the cloud template) under the plan. This command may provide a summary of updates required involving one or more resources to achieve the desired state. In some examples, the command may compare the desired state of the cloud infrastructure requested within the configuration file with present cloud infrastructure and provide a summary of the changes required to achieve the desired state. Specifically, the plan may show the user preview about what resources will be changed using CRUD (create, read, update, and delete operations) based on parsing of the configuration file. The plan command may not change the actual cloud infrastructure.

In step 318, the container cluster job or task may collect logs as initialization and planning are executed over CLI. The logs may then be transferred to the cloud management platform. Further, in step 320, the cloud management platform may download the plan upon execution. Once the plan is downloaded, the job may be deleted or destroyed in step 320. In some examples, the container cluster job or task may run a predefined command to save the plan to a file as an artifact within the cloud management platform which can be then used for approval from a user or administrator. In some alternative embodiments, information generated while executing the plan can be used to make updates to the cloud template. Accordingly, as a result of performing steps 312, 314, 316, 318, and 320 under plan phase 310, the cloud management platform may receive and store the plan showing a summary of the changes required to achieve the desired state.

In some examples, after the plan is stored, the cloud management platform may apply native governance and policies to a preview of the cloud infrastructure generated during plan phase 310 in step 330. In some examples, the native policies may determine whether the user or an administrator requesting the desired state of cloud infrastructure are authorized. Similarly, different policies and predefined rules may be enforced to the saved plan in order to validate the plan.

In some examples, based on the downloaded plan, external governance associated with the resources may be plugged to the cloud management platform. Accordingly, governance and policies specific to the cloud infrastructure tool may also be enforced by the cloud management platform. The customer may add or plugin additional governance using the cloud management platform workflows or functions. In some examples, after a plan phase is executed in 310, an event broker subscription (EBS) event is published, where the EBS event includes the plan information. The published EBS event may provide preview of what cloud resources will be deployed with exact configuration when the plan is executed. In some examples, the user may review the published plan information to understand which cloud resources will be created in which cloud zones and determine if certain cloud zones are restricted for only certain types of resources which may further impact the cost of the deployment. In addition, the user may review the plan information to compute a total cost for the deployment of the cloud resources.

A user may subscribe to the EBS event using the cloud management platform workflows or functions. In the above examples, as part of governance, the EBS event may be used to validate or approve the plan that is part of an EBS event payload. For example, a user (or an administrator of the cloud management platform) may approve or reject a deployment of a virtual machine (VM) based on the published plan information. Upon applying the cloud management platform specific native policies over one or more requested resources under the plan, the cloud management platform may determine whether the plan is valid for deployment. In some examples, upon receiving a plan rejection from the user, the steps such as applying policies and executing the plan (e.g., steps 330-370 of FIG. 3A) are not performed. In some examples, once the plan information is published as EBS event, a user may not modify the plan. To modify the plan, the user may need to modify the cloud template and perform the plan phase 310 again.

In step 340, the cloud management platform may further present the plan in the form of the template to the user or cloud management platform administrator for validation. Alternatively, the cloud management platform may automatically determine whether one or more resources requested under the plan is valid based on predetermined acceptable resources for the cloud management platform. In some examples, in step 340, a user may approve the plan using the cloud management platform based on the one or more resources requested under the plan. Alternatively, the cloud management platform may determine that the plan is valid. For example, if the size of storage requested by the user as part of the plan is within a predetermined threshold for the memory storage, then the cloud management platform may determine that the storage request under the plan is valid, and therefore, the plan is valid and approved for deployment. In cases where the cloud management platform is able to autonomously validate the plan a user may still decide additional changes are needed prior to proceeding further.

In the event the PLAN includes a clustered resource and the number of resources is parameterized as blueprint input, then while deploying a blueprint, a user of the blueprint can provide a value for the number of resources. So, if the user deploys 500 machines an administrator can review the PLAN and approve or reject it.

In step 350, the cloud management platform may further perform a series of sub-steps (352, 354, 356, 358, and 360) to create the cloud infrastructure in accordance with the downloaded plan, under apply phase 350. Specifically, the cloud management platform may use a container orchestration platform deployed over cloud management platform to perform an apply command to deploy the plan downloaded under step 320. In step 352, the cloud management platform may create a job or task over the container orchestration platform to execute the plan command over the cloud management platform. In step 354, the cloud management platform may upload content (or plan) that was validated under step 340.

In some examples, in step 356, the cloud management platform may instruct the job or task to further execute an apply command. The job or task may execute the apply command over command line interface (CLI) associated with the cloud infrastructure tool. The apply command may be responsible for creating the infrastructure or making actual changes to an already established cloud infrastructure. To execute the apply command, the Kubernetes job or task may pass the previously generated plan to the CLI. During the execution of the apply command, all changes documented in the plan are set in motion. In some examples, a configuration may be passed to the CLI along with the apply command if the plan does not exist. In such cases, a plan may be generated with the apply command first and then executed upon approval from a user.

In step 358, the job or task running on the container orchestration platform may collect logs as the apply command is executed over CLI. The logs may then be transferred to the cloud management platform. Further, in step 360, the cloud management platform may require the job to download the state upon execution to the cloud management platform. Once the state is downloaded, the job may be deleted in step 360.

In step 370, the cloud resources based on the state of the cloud infrastructure may be published on a display area of a graphical user interface or a dashboard for the user to verify and monitor. In some instances, these resources may be mapped to native cloud management platform resources. Accordingly, the cloud management platform can manage these resources in a similar manner as it manages the cloud management platform native resources.

FIG. 3B shows a graphical user interface 380 of cloud management platform 122, depicting resources of an exemplary hybrid cloud template that includes native resource 382 and non-native resources 384 and 386. Graphical user interface 380 allows a user to modify relationships between the native resources within canvas 388 and to modify the resources or relationships between the resources within code window 390 prior to executing the steps illustrated in FIG. 3A. Non-native resources 384 and 386 can be established by importing one or more configuration files 202 into cloud management platform 122. In some embodiments, cloud management platform also allows for modification of non-native resources prior to deployment. Dependencies between resources can be established in either direction. In this exemplary configuration, native resource 382 is shown depending from non-native resources 384 and 386. When non-native resources 384 and 386 do not depend from other resources, the approval phase will follow the plan phase as described in FIG. 3A. In general, the dependencies allow for staggered provisioning so that dependent components or resources are not provisioned prematurely.

Figure 4A:
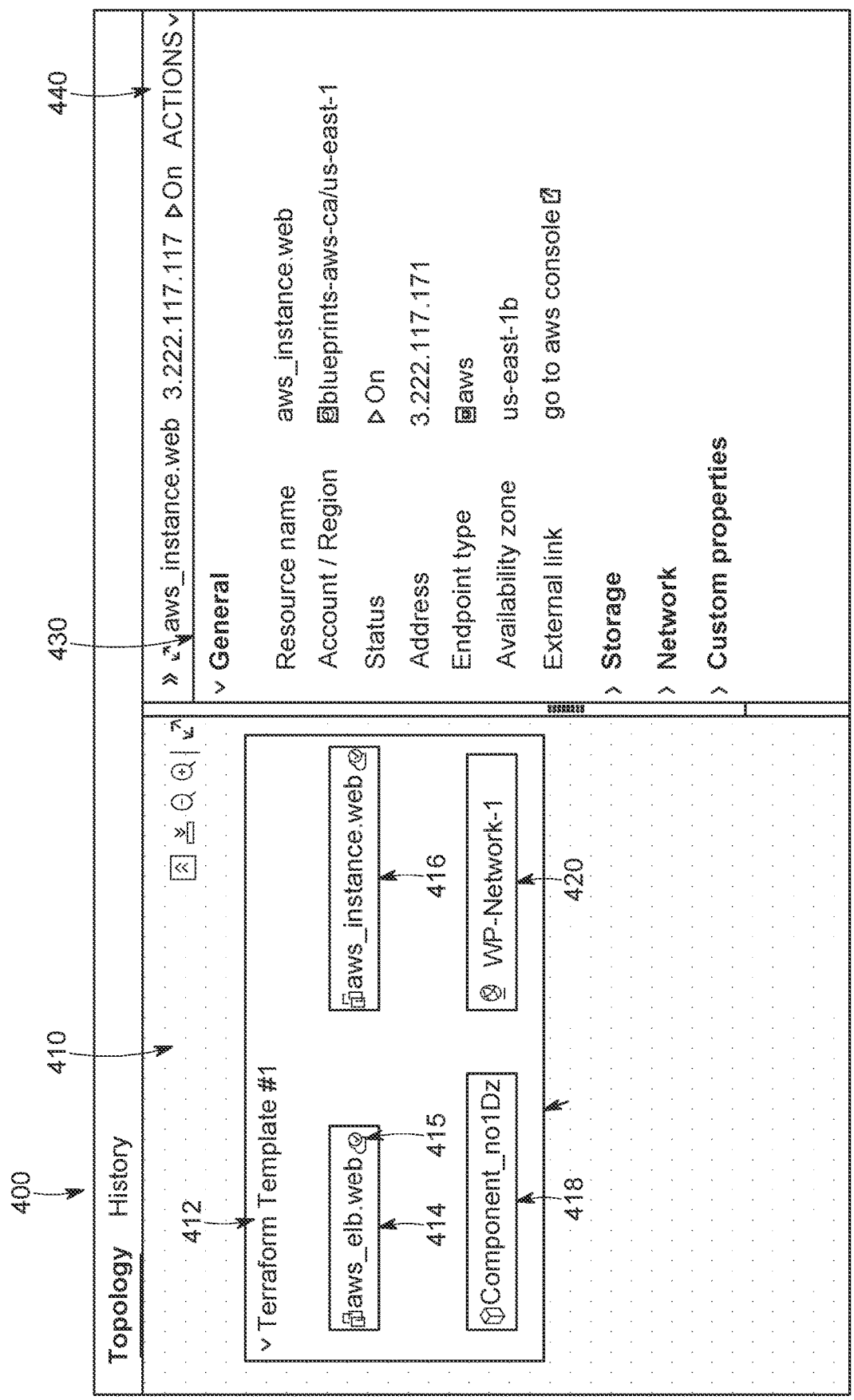
FIG. 4A shows a graphical user interface displaying topology of the cloud resources, in accordance with the embodiments described herein.

FIG. 4A shows a graphical user interface displaying topology of the cloud resources, in accordance with the embodiments described herein. Specifically, a graphical user interface 400 may display topology 410 showing the one or more cloud resources of a cloud infrastructure created using steps as discussed in FIG. 3A. In some examples, the topology 410 may show the one or more resources (e.g., 414, 416, and 418), state information associated with the one or more resources (e.g., 415), and their relationship with the cloud template (e.g., 412).

In some examples, upon creation of cloud infrastructure, as suggested in steps described in FIG. 3A, the cloud management platform (e.g., 122) may retrieve state information of one or more cloud resources within the cloud infrastructure. Specifically, after steps for the execution phase 350 are performed (as shown in FIG. 3A), references to the cloud resources of the cloud infrastructure are exported into a state file as deployed resources. Further, the state file may be retrieved or downloaded by the cloud management platform by executing a command over Command Line Interface (CLI) associated with the cloud infrastructure tool (as discussed in step 360).

In the above examples, the cloud management platform (e.g., 122) may parse through the state file (downloaded in step 360 of FIG. 3A) after deploying the cloud infrastructure. The cloud management platform may determine one or more resources created by the cloud infrastructure tool as a result of parsing the state file. The cloud management platform may orchestrate and create the one or more resources within a graphical user interface 400 of the cloud management platform. The cloud management platform may create a topology 410 within the graphical user interface 400, as shown in FIG. 4A.

In some examples, the cloud management platform (e.g., 122) may display a topology of the cloud infrastructure based on the state information (from the state file downloaded in step 360) and the cloud template (created in step 302), as shown in topology 410 of FIG. 4A. In some examples and as illustrated, the topology may show the cloud template 412 as a parent component. Within the parent component 412, the topology may show the one or more cloud resources as child components (e.g., 414, 416, 418, and 420), as shown in FIG. 4A. The child components (e.g., 414, 416, 418, and 420) within the parent component 412 may reflect one or more cloud resources within the cloud infrastructure according to the resource references and state information within the state file.

In some examples, as shown in FIG. 4A, the parent component 412 is "Terraform Template #1." The parent component 412 may be mapped to a cloud template that is named "Terraform Template #1" hosted on the Global Information Tracker (GIT) repository. The child components within the parent components 412 are "aws_esb_Web" 414, "aws_instance_web" 416, "Component_NotDz" 418, and "WP-Network-1" 420. Each of the cloud resources presented as the child resources may be created as a result of deploying the cloud template ("Terraform Template #1") using the cloud integration tool (e.g., "Terraform").

In some examples, each of the child components (414, 416, 418, 420) presenting the cloud resource may show additional detail about the cloud resource such as a resource name, a resource type, resource index, and other attributes of the child component. In the above examples, all of the cloud resources created in response to deploying the cloud template (under execution phase 350) are presented as child components within the topology 410. The cloud resources are infrastructure objects or components created to support the cloud infrastructure. Each of the cloud resources may be a processor, memory, network or storage related component for supporting one or more client applications using the cloud infrastructure. In some examples, the cloud resource may be an instance (e.g., aws_instance_web 416) of the processor, memory, network and/or storage related component or service. For example, aws_instance_web 416 may be associated with an instance of a virtual machine providing compute capacity to the one or more applications using the cloud infrastructure. In some examples, state information with one or more cloud resources may be displayed along with identification of the cloud resources (presented as child components within the topology).

In some examples, the topology 410 may further display whether the cloud resources that are presented as child components (e.g., 414, 416, 418) within topology 410 were discovered during the execution phase 350 based on the state information. Specifically, if a cloud resource 414 was discovered then the cloud resource 414 may show an indication or a checkmark 415 within the topology 410. In addition, if a cloud resource is discovered during execution phase 350 then the cloud management platform may map the cloud resource to its native resource and enable a user to manage the cloud resource using steps as discussed in the FIG. 6 description.

In some examples, upon selecting a discovered cloud resource (e.g., a child component 416) within the topology 410, the display area 420 may provide additional information about the cloud resource. The additional information may include name of the resource, status of the resource, account associated with the resource, and other information as shown in display area 430 of the FIG. 4A. The cloud management platform may use both template and the state file for determining type, identification, and status information of the one or more deployed cloud resources. The display area 420 for the cloud resource may further show actions tab 440 which may enable user to perform one or more actions on the cloud resource. The actions tab 440 is further described in FIG. 4B description.

In some examples, if a cloud resource is not discovered during the execution phase 350 (based on the state file), the topology 410 may not show a checkmark or an indication over the child component showing the cloud resource. For example, the cloud resource 418 ("Component_NotDz") was not discovered during the execution phase according to the state file. As a result, no checkmark or indication is shown for the cloud resource 418. For an undiscovered cloud resource, graphical user interface may allow a user to define the undiscovered resource and create customized actions for the resource.

In the above examples, the cloud management platform may periodically request a Command Line Interface (CLI) associated with the cloud infrastructure tool over the orchestration platform (or coiner clusters) to get updated state information for the one or more resources within the cloud infrastructure. Specifically, the cloud management platform may request to execute a read command over CLI to get state information for the one or more cloud resources. Upon execution of the read command, the cloud management platform may receive a new state file that includes the latest status information for the cloud resources. Accordingly, the topology 410 may be updated based on the latest status information for the cloud resources. In some examples, the cloud management platform may determine topology 410 based on the plan after the plan is executed in plan phase 350, as shown in FIG. 3A. Specifically, the topology 410 may be determined by parsing the plan file downloaded in step 320 of FIG. 3A.

Figure 4B:
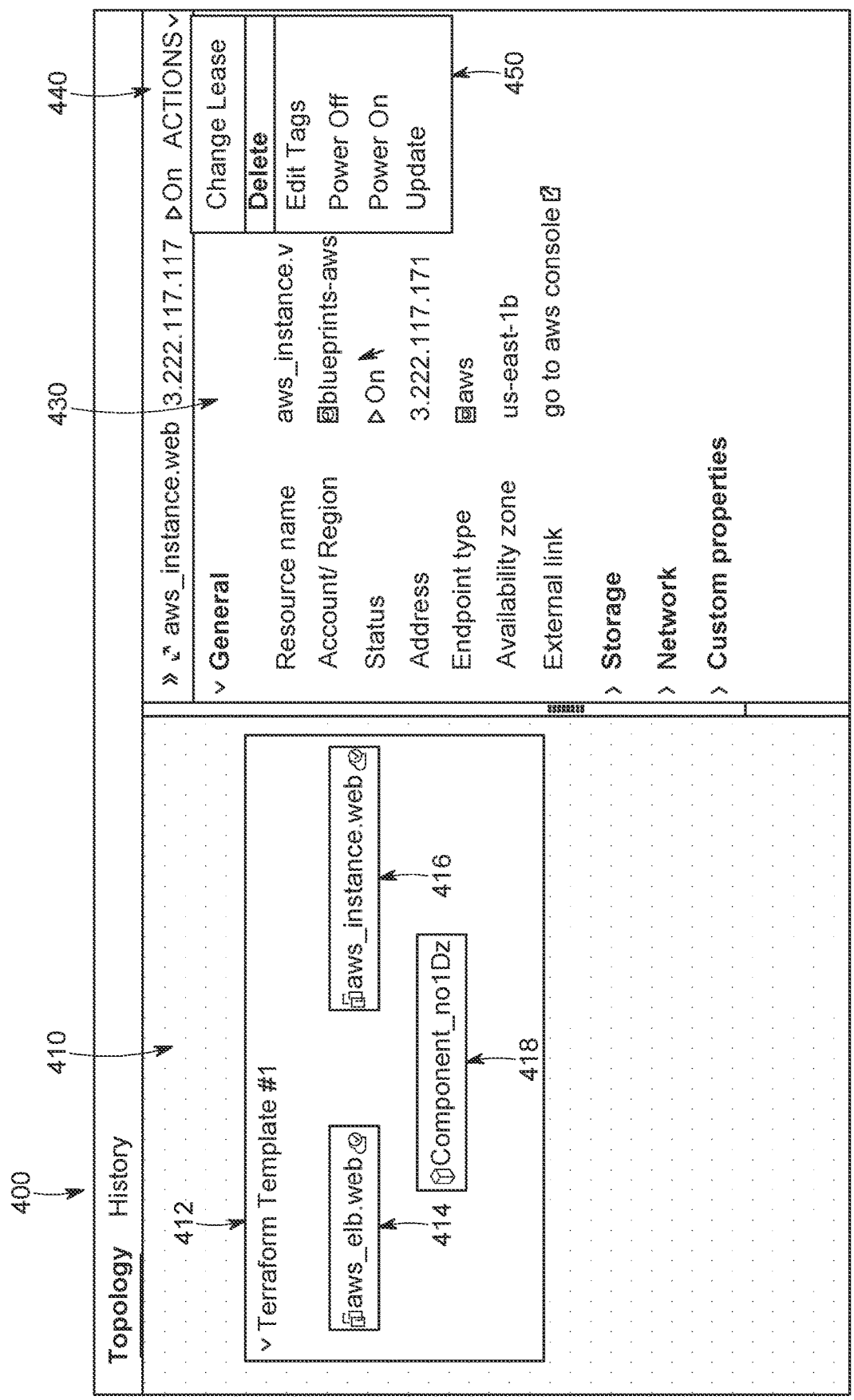
FIG. 4B shows a graphical user interface displaying topology of the cloud resources and a list of available actions for the cloud resources, in accordance with the embodiments described herein.

In the above examples, the cloud management platform (e.g., 122) may correlate the one or more resources with native resources associated with the cloud management platform in order to present resources to the user and manage the resources using the native format of the cloud management platform. FIG. 4B describes mappings for one or more cloud resources and one or more actions to be performed on the one or more cloud resources.

FIG. 4B shows a graphical user interface displaying topology of the cloud resources and a list of available actions for the cloud resources, in accordance with the embodiments described herein. Specifically, FIG. 4B shows how the graphical user interface within the cloud management platform provides a user an ability to invoke one or more actions from an actions tab 440 to control or manage one or more cloud resources created using the cloud infrastructure tool.

In some examples, as described in FIG. 4A description, the cloud management platform may obtain the state information of the one or more cloud resources within the cloud infrastructure from a state file after the infrastructure is deployed as part of execute phase 350, as shown in FIG. 3A. Based on the state information and the content within the cloud template, the cloud management platform may identify type, status, and other information about the one or more resources. Specifically, the cloud management platform may also determine whether the one or more cloud resources are discovered or undiscovered resources based on the state information within the state file.

In some examples, upon determining that a cloud resource (e.g., 414 or 416) was discovered, the cloud management platform may determine a type of the cloud resource. Each resource may be associated with a single resource type, which determines a type of infrastructure object or component it supports within the cloud infrastructure. The resource type may be defined and implemented by the cloud service provider (e.g., AWS, Azure, etc.). The cloud management platform may obtain one or more plugins or Application Programming Interfaces (APIs) to understand the one or more resource types within the state file. For example, a resource type for an AWS resource may be an Amazon EC2 (Elastic Compute Cloud) instance which may be an instance of a web service that provides compute capacity to one or more applications using the cloud infrastructure.

In some examples, for each one of the discovered resources (e.g., 414, 416) or non-native cloud resources, the cloud management platform may identify a logical resource within the cloud management platform based on the type of the cloud resource. Specifically, after determining the resource type of the cloud resources, the cloud management platform may identify a native resource associated with the cloud management platform that is of similar type. In some examples, the cloud management platform may include a set of native resources or on-premise resources. The native resource may be an instance of the processor, memory, network and/or storage related component within the cloud management platform. In some examples, the cloud management platform may include a list of types and properties associated with the native resources. This information may be used to map the non-native resources to the native resources. For example, an identification or a resource name (e.g., ARN) of a native resource (e.g., a virtual machine) may be mapped to the non-native resource (e.g., 414) of the same type.

In the above examples, upon identifying a native resource for the cloud resource, the cloud management platform may map an identification of the native resource to the cloud resource. The cloud management platform may store the mapping of each of the cloud resources to its corresponding native resource identified by the cloud management platform. The mapping of the cloud resources to the native resources may allow the cloud management platform to manage the cloud resources as it would manage the native resources. In some examples, each of the cloud resources and its corresponding native resource within the cloud management platform may be assigned the same identification, in accordance with the mapping.

In some examples, the actions tab 440 may provide a list of actions in a native format to manage a life cycle of a cloud resource (e.g., 416) after the resource is mapped to the native resource. As shown in FIG. 4B, for each of the discovered cloud resources, actions tab 440 may be provided to the user to manage the life cycle of the cloud resource. Within actions tab 440 (a drop down menu), a list of actions 450 may be provided to a user. The user may select one of the actions from the list of actions 450 to update the state of the cloud resource. For example, a user may directly change lease or contract associated with the cloud resource by invoking an action, "Change Lease" within the list of actions shown in 440. Similarly, a user may delete the resource, edit it's description or tag within the topology, power it on/off, or update the resource by invoking an action within the actions tab 440. Similarly, the user may perform other actions such as resizing virtual machines for a cloud resource, creating a snapshot, adding a disk, adding a tag and the like using similar actions tab (e.g., 440) for the corresponding native resources within the cloud management platform. In the above examples, the cloud resources (or non-native resources) are stored within the cloud management platform as native resources of the management platform, so, the cloud resources can be managed in similar manner as the management platform's native resources.

In the above examples, the cloud management platform may direct the cloud infrastructure tool associated with the cloud template to perform the one or more actions selected by the user within the actions tab 440. The cloud management platform may delegate a request for the selected action to a CLI command associated with the cloud infrastructure tool to perform requested changes by the user. Specifically, the cloud management platform may create a job or task over a container cluster to submit a request to the CLI to update the cloud resource in accordance with the selected action from the user.

In some examples, the cloud management platform may also provide a list of actions (e.g., 440) for undiscovered resources. Specifically, for undiscovered resources (e.g., 418), the cloud management platform may allow a user to configure one or more customized actions for managing the resource. The cloud management platform may allow the user to map a workflow or a set of Action Based Extensibility (ABX) actions for managing the undiscovered resources. Accordingly, for the undiscovered resources, the cloud management platform may display one or more customized actions in the actions tab 440. If the user selects a customized action within the actions tab 440, the management platform may simply invoke the user defined workflow or the set of ABX actions for the customized action.

Figure 4C:
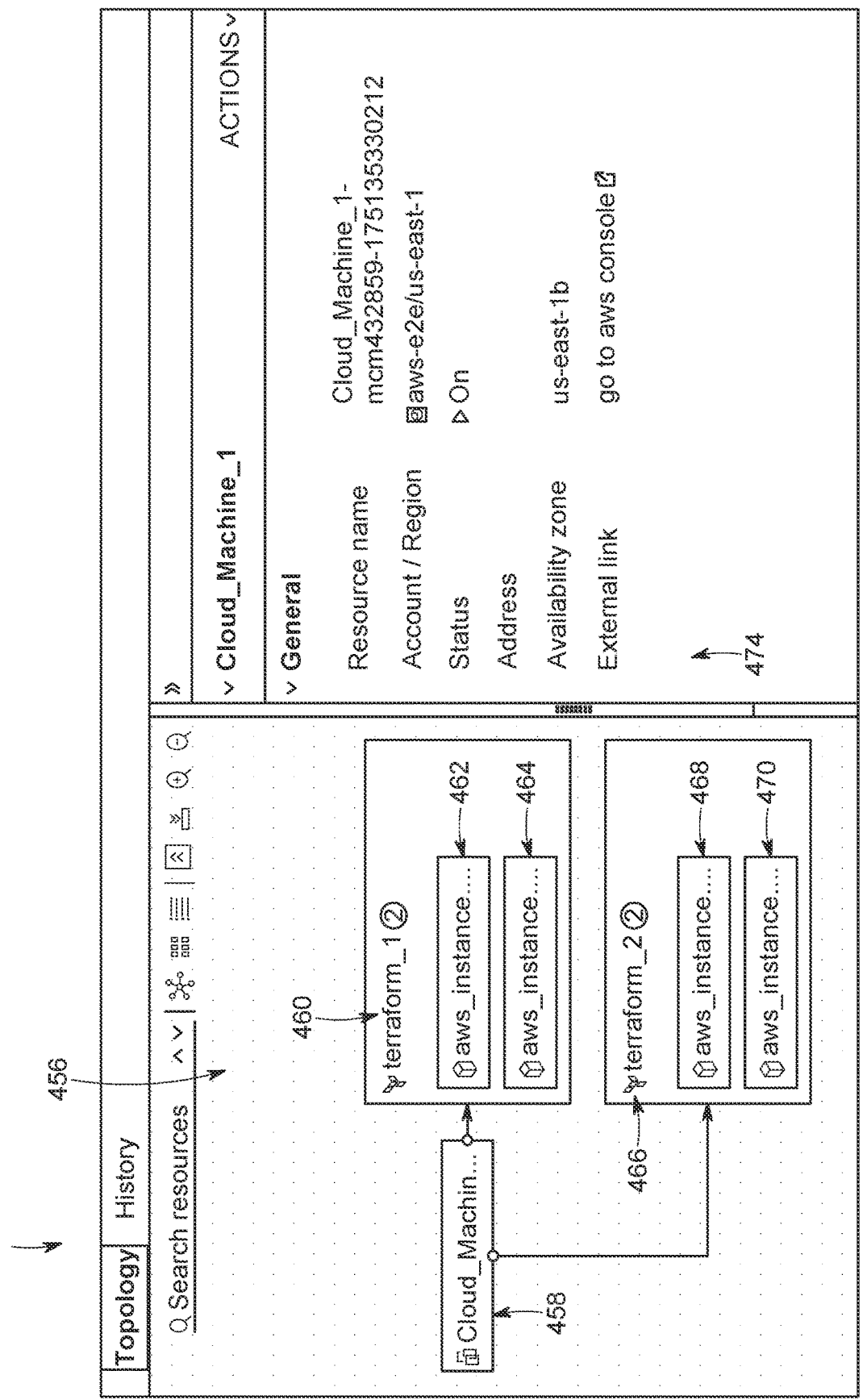
FIG. 4C shows a graphical user interface displaying an example topology of native and non-native cloud resources, in accordance with the embodiments described herein.

FIG. 4C shows a graphical user interface displaying an example topology of native and non-native cloud resources, in accordance with the embodiments described herein. Specifically, a graphical user interface 455 may display a topology 456 showing one or more native resources (e.g., cloud machine 458) and non-native cloud resources (e.g., terraform_1 460) of a deployed cloud infrastructure based on a cloud template (using one or more steps as discussed in FIG. 3A). The topology 456 may further show relationship of the native resources, non-native cloud resources and one or more cloud templates associated with the non-native cloud resources.

In some examples, an example cloud template for deploying multiple non-native and native resources using a cloud integration tool (e.g., Terraform) is shown below.

```
inputs:
    instance_type:
        type: string
        default: t2.micro
        description: AWS instance type
    department:
        type: string
        description: Department tag
resources:
    terraform_2:
        type: Cloud.Terraform.Configuration
        properties:
            providers:
                name: aws
                cloudZone: aws-e2e/us-east-1
            variables:
                instance_type: '${input.instance_type}'
                department: '${input.department}'
            terraform Version: 0.12.29
            contentSource:
                contentSourceId:    d56f6baa-820b-417f-a38c-
                    103bc1684c2d
                path: /template2
                version:
                    28afle4f2a8b91621cea9873eb69643d83adc813
    terraform_1:
        type: Cloud.Terraform.Configuration
        properties:
            providers:
                name: aws
                cloudZone: aws-e2e/us-east-1
            variables:
                instance_type: '${input.instance_type}'
                department: '${input.department}'
            terraform Version: 0.12.29
            contentSource:
                contentSourceId:    d56f6baa-820b-417f-a38c-
                    103bc1684c2d
                path: /template2
                version:
                    28afle4f2a8b91621cea9873eb69643d83adc813
    Cloud_Machine_1:
        type: Cloud.Machine
        dependsOn:
            terraform_2
            terraform_1
        properties:
            image: ubuntu
            flavor: small
```

As shown in the above example, within the cloud template (e.g., template2), multiple non-native cloud resources (e.g., terraform_1 460) may be parametered and mapped as variables of the cloud infrastructure tool (e.g., Cloud.Terraform.Configuration). The variables may be further mapped as an input to the cloud template. Accordingly, while deploying the cloud template (e.g., during execute phase 350), a user can provide a value for the variable (e.g., instance type shown in above example template) which may be further sent as an input while executing the cloud template (e.g., during execute phase 350) to achieve a desired state of cloud infrastructure. In addition, the native cloud resources (e.g., cloud_machine_1 458) may depend on non-native cloud resources (e.g., terraform_1 460 and terraform_2 466) as shown in the above template example.

FIG. 4C shows a graphical user interface 455 displaying an example topology of native and non-native cloud resources in accordance with the above example cloud template (template 2). Specifically, a graphical user interface 455 may display topology 456 showing one or more native resources (e.g., cloud machine 458) and non-native cloud resources (e.g., terraform_1 460) of a deployed cloud infrastructure based on template 2. In some examples, as shown in FIG. 4C, the cloud management platform may orchestrate and create a topology of one or more resources within a graphical user interface 455 based on one or more resources deployed using steps shown in FIG. 3A.

In some examples and as illustrated, the topology 456 show non-native cloud resources (terraform_1 460 and terraform_2 466) as parent components. Within the parent components, the topology 456 may show the one or more instances of the non-native cloud resource as child components (e.g., 462, 464, 468, and 470), as shown in FIG. 4C. The child components (e.g., 462, 464, 468, and 470) within the parent components (460 and 466) may reflect one or more instances of non-native resources within the cloud infrastructure according to the resource references within the cloud template and/or state information within the state file (downloaded using steps described in FIG. 3A).

In some examples, as shown in FIG. 4C, the parent component terraform_1 460 is a non-native cloud resource. The parent component 460 may be mapped to a cloud template that is named "template 2" hosted on the Global Information Tracker (GIT) repository. The child components within the parent component are "aws_instance 462 and "aws_instance" 464. Each of the instances presented as the child resources may be created as a result of deploying the cloud template (template 2) using the cloud integration tool (e.g., "Terraform"). Similarly, the parent component 466 is a non-native cloud resource "terraform_2," as shown in topology 456. The child components within the parent component 466 are "aws_instance 468 and "aws_instance" 470.

In some examples, the topology 456 may further show relationship of the native resources, non-native cloud resources and one or more cloud templates associated with the non-native cloud resources. Further, in the above example, both non-native cloud resources (terraform_1 460 and terraform_2 466) are associated with template 2. In the topology 456, the reference to template 2 is provided as a letter two in a circle in the display area next to the label for the non-native cloud resource terraform_1 460. The topology 456 may further display deployed native resources (e.g., 458) associated with the cloud infrastructure. In the above example, as shown in FIG. 4C, the native resource, the cloud_machine_1 458, may be involved in deployment of the cloud resources terraform_1 460 and terraform_2 466.

Accordingly, a connection between the cloud machine 458, terraform_1 460, and terraform_2 466 is shown in topology 456.

In the above examples, upon selecting a native resource 458 within the topology 456, the display area 474 may provide additional information about the native resource. The additional information may include name of the resource, status of the resource, account associated with the resource, and other information as shown in display area 474 of the FIG. 4C. The native resources are infrastructure components or machines created to support creation and maintenance of non-native cloud resources (e.g., terraform 460). In some examples, the native cloud resource may be an instance (e.g., aws-e2e instance) of the processor, memory, network and/or storage related component or service. Upon selecting the native cloud resource (e.g., cloud_machine_1), the display area 474 for the native resource may further show actions tab which may enable user to perform one or more actions (e.g., resizing virtual machines, creating a snapshot, adding a disk, adding a tag, and the like) on the native resource.

Figure 4D:
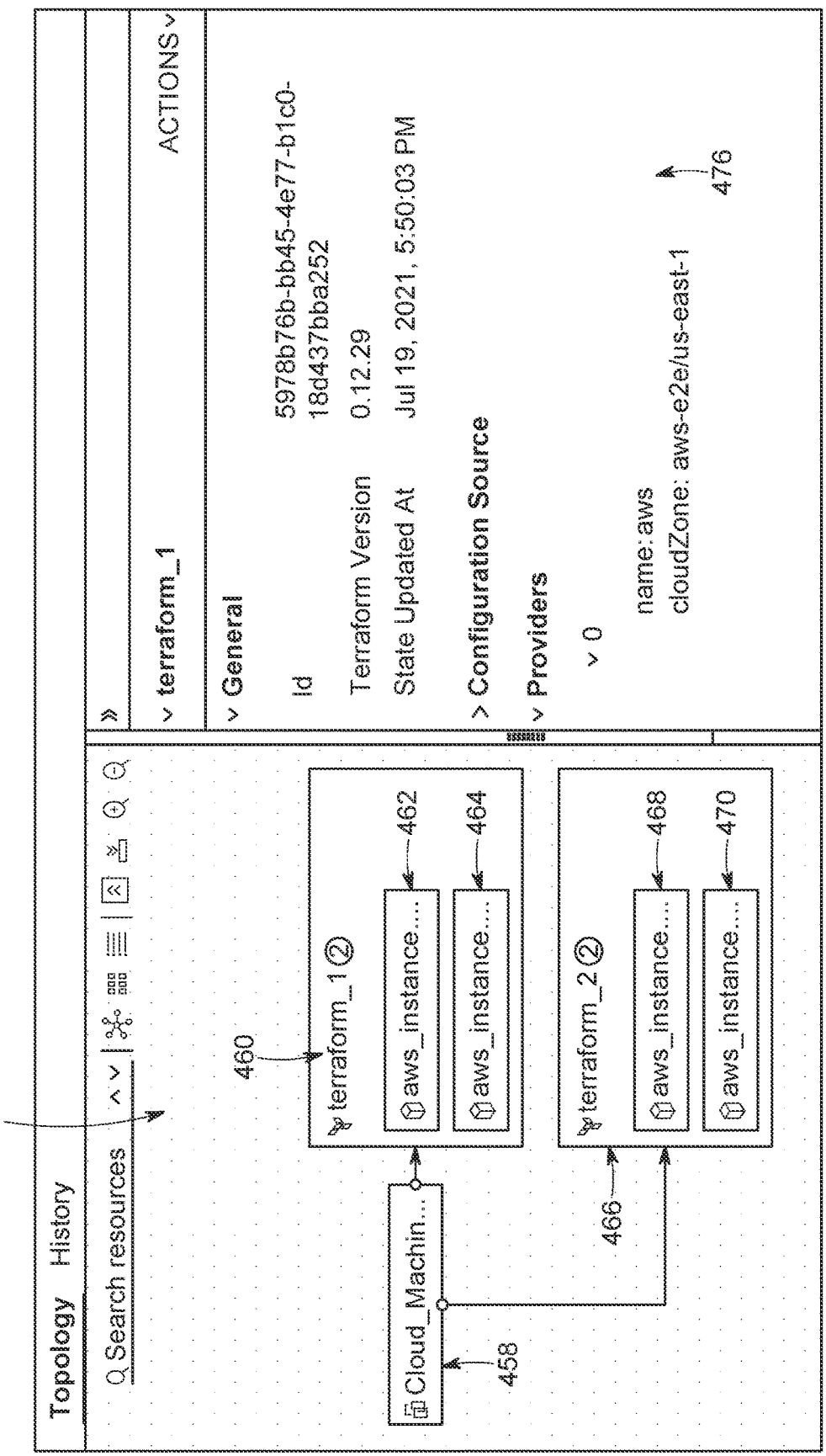
FIG. 4D shows a graphical user interface displaying an example topology of native and non-native cloud resources, in accordance with the embodiments described herein.

FIG. 4D shows a graphical user interface displaying an example topology of native and non-native cloud resources, in accordance with the embodiments described herein. Specifically, FIG. 4D shows the topology 456 of FIG. 4C where the user has selected a non-native cloud resource terraform_1 460 within the topology 456. Upon selection of the non-native cloud resource (e.g., terraform_1 460) within topology 456, display area 476 is shown.

In the above examples, the display area 476 may provide additional detail about the non-native cloud resource (e.g., terraform_1 460) and a cloud integration tool associated with the resource. The additional detail may include an identification of the non-native cloud resource, version of the cloud integration tool associated with the resource, state information about the resource, and other information as shown in display area 476 of the FIG. 4D. Each of the cloud resources may include one or more instances of components or objects (e.g., aws_instance 462 and aws_instance 464 within non-native cloud resource terraform_1 460) for supporting the desired state of cloud infrastructure. The one or more instances may be an instance of a processor, memory, network or storage related component or service.

In the above examples, the non-native cloud resources are infrastructure components or machines created to support creation and maintenance a desired state of the cloud infrastructure (achieved using steps discussed in FIG. 3A description). In some examples, the non-native cloud resource (e.g., 460) may include one or more instances (e.g., aws_instance 462 and aws_instance 464). The display area 476 for the non-native resource may further show actions tab which may enable the user to perform one or more actions (e.g., resizing virtual machines for a cloud resource, creating a snapshot, adding a disk, adding a tag and the like) on the non-native resource. Alternatively, the actions tab within the display area 476 may enable the user to perform one or more actions on each of the instances (e.g., aws_instance 462 or aws_instance 464) associated with the non-native cloud resource (e.g., terraform_1 460).

FIG. 4E shows a user interface displaying a state of one or more commands or requests (discussed in FIG. 3A description) processed for creating and/or managing the cloud infrastructure. The user interface 475, as shown in FIG. 4E, may display a state of the one or more commands (e.g., plan command 316) or functions executed over command line interface (CLI) associated with the cloud infrastructure tool to create or manage the desired state of the cloud infrastructure. In some examples, the user interface 475 is shown upon selection of history tab in the user interface 455, as shown in FIG. 4C.

The user interface 475 may include a column timestamp 482 showing dates and times associated with changes in the status of the one or more commands. The user interface 475 may include a column status 484 showing a status of the one or more commands processed for achieving a desired state of the cloud infrastructure. The user interface 475 may further include a column resource type 486 showing type of resources deployed or maintained using the one or more commands. The user interface 475 may include a column resource name 488 showing name of cloud resources deployed and/or managed using the one or more commands.

In some examples, as shown in a row 480 of the user interface 475 of FIG. 4E, upon performing steps to execute plan command 316, the user interface may show that the plan phase execution was finished on Jul. 23, 2021 at 9:32:09 PM. Further, the user interface 475 may further show that the resource type associated with the plan is Cloud.Terraform.Configuration and resource name to be updated by the plan is terraform_2, as shown in the row 480. Similarly, a history of status information associated with various commands or requests is displayed over the user interface 475 for the user to monitor the creation and/or management of different cloud resources to achieve the desired state of the cloud infrastructure.

In some examples, as shown in a row 490 of the user interface 475 of FIG. 4E, prior to execution of the plan command (as shown in step 316 of FIG. 3A), a plan approval by the user or an administrator may be performed (as illustrated in FIG. 3A description). In some examples, when the non-native cloud resources (e.g., terraform_1 460) does not have any dependency on other resources (e.g., native resource cloud_machine_1 458), the approval of the plan is performed after the plan generation within plan phase 310. In alternative examples, when the non-native cloud resources (e.g., terraform_1 460) does have dependency on other resources (e.g., native resource cloud_machine_1 458), as shown in FIG. 4C, generation of the plan may be performed after the user has approved the required dependencies and configurations for the plan.

In some examples, as shown in FIG. 4E, an approval phase (shown in line 490) is performed prior to the plan generation and execution because while the two non-native resources (e.g., terraform_460 and terraform_2 466) does not need approval as they are not dependent on any other native resource, the native resource (cloud_machine_1 458) is dependent on the two non-native resources (e.g., terraform_460 and terraform_2 466). In some examples, further information (e.g., logs, processing information, etc.) regarding processing of the commands or requests may be shown in additional columns in the user interface 475.

Figure 5:
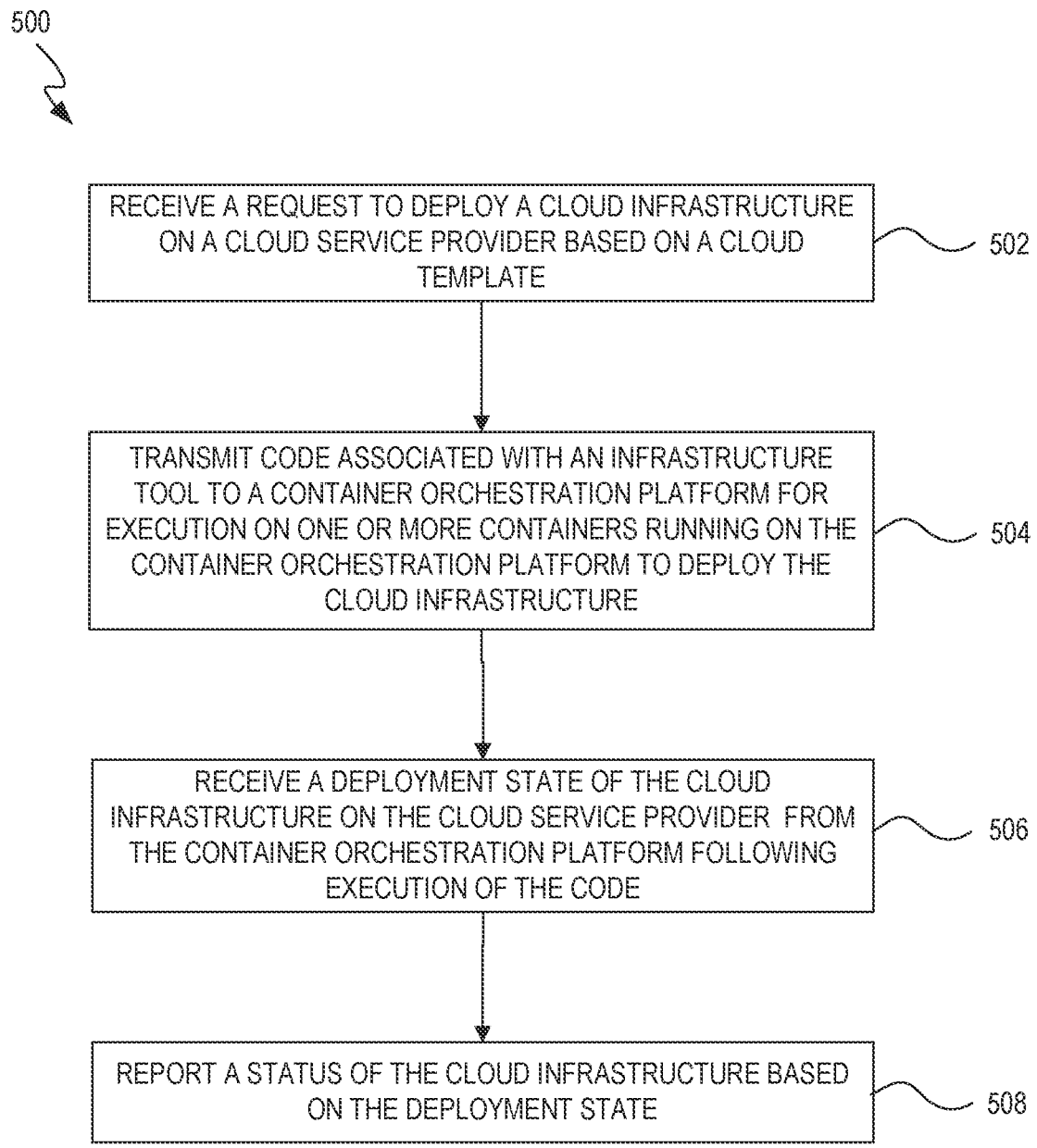
FIG. 5 shows a flow diagram illustrating a process for deploying a cloud infrastructure on a cloud service provider using a cloud infrastructure tool.

FIG. 5 shows a flow diagram illustrating a process 500 for deploying a cloud infrastructure on a cloud service provider using a cloud infrastructure tool. In step 502, a request to deploy a cloud infrastructure on a cloud service provider is received at a cloud management platform. The cloud infrastructure is defined at least in part by a cloud template that is generated by the cloud management platform and includes one or more configuration instructions associated with a cloud infrastructure tool that is well suited for interacting with and/or configuring cloud infrastructure on multiple cloud service providers.

In step 504, the configuration instructions associated with the cloud infrastructure tool are transmitted to a container orchestration platform for execution on one or more containers running on the container orchestration platform. In some examples, each set of configuration instructions can be configured to run in a separate command line interface instance. Generating the cloud infrastructure using multiple command line interface instances allows the deployment to be performed more efficiently. In some examples, the configuration instructions can be transmitted to the container orchestration platform multiple times to deploy the cloud infrastructure. For example, a first transmission of the configuration instructions can be used to preview operation of the cloud infrastructure without performing any changes to the cloud service provider. Cloud infrastructure tools can be equipped with initialization commands that allow for a preview or test run that includes interaction with the cloud service provider and connection with various other resources used by the planned cloud infrastructure without performing an actual deployment of resources to the cloud service provider. This preview or test run allows data to be gathered and transmitted back to the cloud management platform. This allows the cloud management platform or a customer using the cloud management platform to make a determination as to the validity of the planned cloud infrastructure. In the case that there are no problems identified, a second transmission of the configuration instructions can be made to the cloud orchestration platform with instructions to execute a full deployment of the cloud infrastructure to the cloud service provider.

In step 506, data received at the command line interface instances can be transmitted back to the cloud management platform to provide a deployment state of the cloud infrastructure. The cloud management platform can also be configured to transmit additional instructions to cloud orchestration platform to request updates to the state of the cloud infrastructure periodically and/or on request. In step 508, cloud management platform can be configured to report a deployment state of the cloud infrastructure based on the data transmitted from the command line interface instances to the cloud management platform. The deployment state can be reported in many ways including by displaying an alert detailing the deployment state on a graphical user interface and sending an electronic message informing a customer or administrator of the cloud management platform of the deployment state.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A non-transitory computer-readable storage medium storing instructions configured to be executed by one or more processors of a server associated with a cloud management platform to carry out steps that include:
   in response to receiving a configuration file associated with a cloud infrastructure tool, wherein the configuration file includes a description of a desired state of a cloud infrastructure for a cloud service provider, creating a cloud template based on the configuration file, wherein the cloud template includes one or more configuration instructions included in the configuration file and associated with the cloud infrastructure tool; and
   in response to receiving a request to deploy the cloud infrastructure on the cloud service provider based on the cloud template of the cloud management platform:
   transmitting the configuration instructions to a container orchestration platform for execution on one or more containers running on the container orchestration platform, the configuration instructions directing the one or more containers to deploy the cloud infrastructure; and
   reporting a status of the cloud infrastructure based on a deployment state of the cloud infrastructure on the cloud service provider, which is received from the container orchestration platform following execution of the configuration instructions.

2. The non-transitory computer-readable storage medium of claim 1, wherein the transmitting further comprises transmitting the configuration instructions to the container orchestration platform for execution over a command line interface associated with the cloud infrastructure tool, the configuration instructions running in the command line interface to direct the one or more containers to deploy the cloud infrastructure.

3. The non-transitory computer-readable storage medium of claim 2, the container orchestration platform having multiple command line interface instances associated with the cloud infrastructure tool, each command line interface instance running in one of the one or more containers, wherein the transmitting further comprises transmitting different ones of the configuration instructions to the container orchestration platform for execution over respective ones of the command line interface instances, each of the different configuration instructions running in a respective one of the command line interface instances to direct each respective container to deploy a different cloud infrastructure.

4. The non-transitory computer-readable storage medium of claim 1, wherein the container orchestration platform is separate and distinct from the cloud service provider.

5. The non-transitory computer-readable storage medium of claim 1, wherein the configuration instructions are second configuration instructions and wherein the one or more processors of the server are further configured to transmit first configuration instructions associated with the cloud infrastructure tool to the container orchestration platform to generate a preview of a deployment of the cloud infrastructure to the cloud service provider.

6. The non-transitory computer-readable storage medium of claim 5, wherein the one or more processors of the server are further configured to enforce policies associated with the cloud infrastructure following transmission of the first configuration instructions to the container orchestration platform.

7. The non-transitory computer-readable storage medium of claim 1, wherein the cloud template includes configuration instructions for accessing one or more cloud resources used for establishing the cloud infrastructure.

8. The non-transitory computer-readable storage medium of claim 1, wherein the deployment state is received from the container orchestration platform as log data generated by at least one command line interface instance running on the container orchestration platform.

9. The non-transitory computer-readable storage medium of claim 1, wherein the one or more processors of the server are further configured to initiate creation of a task on the container orchestration platform, wherein the task is used to execute the configuration instructions received from the cloud management platform.

10. The non-transitory computer-readable storage medium of claim 1, wherein the configuration instructions reference a plurality of cloud resources included in the cloud infrastructure.

11. The non-transitory computer-readable storage medium of claim 10, wherein the configuration instructions define a cloud zone from which to select the plurality of cloud resources.

12. The non-transitory computer-readable storage medium of claim 1, wherein the cloud management platform is configured to manage a plurality of cloud infrastructures located on a plurality of cloud service providers.

13. The non-transitory computer-readable storage medium of claim 1, wherein deploying the cloud infrastructure comprises updating the cloud infrastructure already running on the cloud service provider.

14. A computer implemented method, comprising:
at a cloud management platform:
in response to receiving a configuration file associated with a cloud infrastructure tool, wherein the configuration file includes a description of a desired state of a cloud infrastructure for a cloud service provider, creating a cloud template based on the configuration file, wherein the cloud template includes one or more configuration instructions included in the configuration file and associated with the cloud infrastructure tool; and
in response to receiving a request to deploy the cloud infrastructure on the cloud service provider based on the cloud template of the cloud management platform:
transmitting the configuration instructions to a container orchestration platform for execution on one or more containers running on the container orchestration platform, the configuration instructions directing the one or more containers to deploy the cloud infrastructure; and
reporting a status of the cloud infrastructure based on a deployment state of the cloud infrastructure on the cloud service provider, which is received from the container orchestration platform following execution of the configuration instructions.

15. The computer implemented method of claim 14, wherein the transmitting further comprises transmitting the configuration instructions to the container orchestration platform for execution over a command line interface associated with the cloud infrastructure tool, the configuration instructions running in the command line interface to direct the one or more containers to deploy the cloud infrastructure.

16. The computer implemented method of claim 15, the container orchestration platform having multiple command line interface instances associated with the cloud infrastructure tool, each command line interface instance running in one of the one or more containers, wherein the transmitting further comprises transmitting different ones of the configuration instructions to the container orchestration platform for execution over respective ones of the command line interface instances, each of the different configuration instructions running in a respective one of the command line interface instances to direct each respective container to deploy a different cloud infrastructure.

17. A server associated with a cloud management platform, the server comprising:
one or more processors; and
memory storing one or more programs configured to be executed by the one or more processors, the one or more programs including instructions for:
in response to receiving a configuration file associated with a cloud infrastructure tool, wherein the configuration file includes a description of a desired state of a cloud infrastructure for a cloud service provider, creating a cloud template based on the configuration file, wherein the cloud template includes one or more configuration instructions included in the configuration file and associated with the cloud infrastructure tool; and
in response to receiving a request to deploy the cloud infrastructure on the cloud service provider based on the cloud template of the cloud management platform:
transmitting the configuration instructions to a container orchestration platform for execution on one or more containers running on the container orchestration platform, the configuration instructions directing the one or more containers to deploy the cloud infrastructure; and
reporting a status of the cloud infrastructure based on a deployment state of the cloud infrastructure on the cloud service provider, which is received from the container orchestration platform following execution of the configuration instructions.

18. The server of claim 17, wherein the transmitting further comprises transmitting the configuration instructions to the container orchestration platform for execution over a command line interface associated with the cloud infrastructure tool, the configuration instructions running in the command line interface to direct the one or more containers to deploy the cloud infrastructure.

\* \* \* \* \*